US008974915B2

(12) United States Patent
Zheng et al.

(10) Patent No.: US 8,974,915 B2
(45) Date of Patent: Mar. 10, 2015

(54) BLOCK COPOLYMER AND NANOFILLER COMPOSITES

(75) Inventors: Junrong Zheng, Stanford, CA (US);
Rahmi Ozisik, Niskayuna, NY (US);
Richard W. Siegel, Menands, NY (US)

(73) Assignee: Rensselaer Polytechnic Institute, Troy, NY (US)

(*) Notice: Subject to any disclaimer, the term of this patent is extended or adjusted under 35 U.S.C. 154(b) by 2052 days.

(21) Appl. No.: 11/080,668

(22) Filed: Mar. 16, 2005

(65) Prior Publication Data

US 2005/0239939 A1    Oct. 27, 2005

Related U.S. Application Data

(60) Provisional application No. 60/553,133, filed on Mar. 16, 2004.

(51) Int. Cl.
*B32B 15/08* (2006.01)
*B82Y 30/00* (2011.01)
*C08K 3/22* (2006.01)

(52) U.S. Cl.
CPC . *B82Y 30/00* (2013.01); *C08K 3/22* (2013.01); *C08K 2003/2296* (2013.01); *C08K 2201/011* (2013.01)
USPC ............ 428/626; 424/615; 424/625; 424/629

(58) Field of Classification Search
USPC .................................... 424/63; 977/753, 778
See application file for complete search history.

(56) References Cited

U.S. PATENT DOCUMENTS

| | | | | |
|---|---|---|---|---|
| 5,911,904 | A * | 6/1999 | Shih et al. | 252/62 |
| 6,419,798 | B1 * | 7/2002 | Topolkaraev et al. | 204/157.15 |
| 6,479,584 | B1 * | 11/2002 | Nakagawa et al. | 525/100 |
| 6,497,957 | B1 * | 12/2002 | Border et al. | 428/402 |
| 6,592,764 | B1 * | 7/2003 | Stucky et al. | 210/660 |
| 6,667,360 | B1 * | 12/2003 | Ng et al. | 524/492 |
| 2003/0093107 | A1 * | 5/2003 | Parsonage et al. | 606/194 |
| 2003/0194537 | A1 * | 10/2003 | Bhagwagar et al. | 428/174 |
| 2004/0132894 | A1 * | 7/2004 | Dias et al. | 524/515 |
| 2004/0242770 | A1 * | 12/2004 | Feldstein et al. | 525/54.3 |
| 2007/0199729 | A1 * | 8/2007 | Siegel et al. | 174/73.1 |

OTHER PUBLICATIONS

Alexander et al., "Polymer-Layered Silicate Nanocomposites : Preparation, Properties and Uses of a New Class of Materials," Materials Science and Engineering, vol. 28, pp. 1-63, 2000.
Balazs, "Interactions of Nanoscopic Particles with Phase-Separating Polymeric Mixtures," Current Opinion in Colloid & Interface Science, Elsevier, Section 4, pp. 443-448, 2000.
Beck et al., "The Effect of Stoichiometry on the Fracture Toughness of a Polyurethane-Urea Elastomer," J. Polymer, Elsevier, vol. 40, pp. 307-313, 1999.
Chan et al., "Ordered Biconstinuous Nanoporous and Nanorelief Ceramic Films From Self Assembling Polymer Precursors," Science, Reports, vol. 286, pp. 1716-1719.1999.
Chang et al., "Nanocomposites of Polyurethane with Various Organoclays : Thermomechanical Properties Morphology, and Gas Permeability," J. Polym. Sci., Part B, Polym Phys., vol. 40, pp. 670-677, 2002.
Chen et al., "In Situ Polymerization and Characterization of Polyester-Based Polyurethane/Nano-Silica Composites," Polymer International, vol. 52, pp. 993-998, 2003.
Fog et al., "Fabrication of Quantum Dot/Polymer Composites: Phosphine-Functionalized Block Copolymers as Passivating Hosts for Cadmium Selenide Nanoclusters," Macromolecules, vol. 30, No. 3, pp. 417-426, 1997.
Fog et al., "Fabrication of Quantum Dot-Polymer Composites: Semiconductor Nanoclusters in Dual-Function Polymer Matrices with Electron-Transporting and Cluster-Passivating Properties," Macromolecules, vol. 30, No. 26, pp. 8433-8439, 1997.
Friedrich, "Crazes and Shear Bands in Semi-Crystalline Thermoplastics," Advances in Polymer Science, vol. 52/53, pp. 225-274, 1983.
Fu et al., "Structure-Property Relationships or Segmented Polyurethanes Containing Monodisperse 2,4-Toluene Diisocyanate/Butanediol Hard Segments," Rubber Chemistry and Technology, vol. 59, pp. 896-911, 1986.
Garrett et al., "Microdomain Morphology of Poly(Urethane Urea) Multiblock Copolymers," Macromolecules, vol. 34, pp. 7066-7070, 2001.
Giannelis, "Polymer-Layered Silicate Nanocomposites: Synthesis, Properties and Applications," Applied Organometallic Chemistry, vol. 12, pp. 675-680, 1998.
Kojima et al., "Mechanical Properties of Nylon 6-Clay Hybrid," Journal of Materials Research, vol. 8, No. 5, p. 1185, 1993.
Li et al., "Direct Observation of the Micromorphology of Polyether Polyerethane Using High-Voltage Electrón Microscopy," J. Polymer, vol. 31, pp. 3-7, 1990.
Martin et al., "Effect of Soft-Segment $CH_2/O$ Ratio on Morphology and Properties of a Series of Polyurethane Elastomers," J. Appl. Polym. Sci., vol. 60, pp. 557-571, 1996.
Martin et al., "The Effect of Average Soft Segment Length on Morphology and Properties of a Series of Polyurethane Elastomers," J. Appl. Polym. Sci., vol. 62, pp. 1377-1386, 1996.
McLean et al., Macromolecules 1997, 30, 8314.
Morkved et al., Appl. Phys. Lett., 1994, 64, 422.
Patterson et al., J. Polym. Sci., Part B, Polym. Phys., 1999, 37, 2303.
Sauer, Chen Adv. Polym. Sci., 1983, 52/53, 169.
Schrader et al., Chem. Rapid Commum., 1998, 9, 597.
Soo et al., J Electrochem Soc. 1999, 146, 32.
Takahashi et al., J. Mater. Sci., 2002, 13, 259.
Templin et al., Science, 1997, 278, 1795.
Thompson et al., Macromolecules 2002, 35, 1060.

(Continued)

*Primary Examiner* — James Rogers
(74) *Attorney, Agent, or Firm* — Foley & Lardner LLP

(57) ABSTRACT

PU/ZnO nanocomposites are provided wherein the addition of less than 1 vol % 33 nm ZnO nanoparticles into a PU matrix effect a decrease in the Young's Modulus and storage modulus of the polymer, while simultaneously effecting an increase glass transition temperature of the polymer. Detailed experiments are described (e.g., FTIR, DMTA, FESEM and AFM) that suggest that the reaction between hydroxyl groups of the ZnO nanoparticles and isocyanate groups of the polyurethane prepolymer disrupts the self-assembly of the phase separation in PU. Phase separation is responsible for the good mechanical properties of PU. Further, detailed experiments suggest that the increase of the glass transition temperature results from the crosslinking effect of the ZnO nanoparticles.

14 Claims, 18 Drawing Sheets

(56) References Cited

OTHER PUBLICATIONS

Tien et al., "High-Tensile-Property Layered Silicates/Polyurethane Nanocomposites by Using Reactive Silicates as Pseudo Chain Extenders," Macromolecules, vol. 34, pp. 9045-9052, 2001.
Tien et al., J. Polymer, 2001, 42, 3213.
Tortora et al., J. Polymer, 2002, 43, 6147.
Wang et al. "Nanolayer Reinforcement of Elastomeric Polyurethane," Chem. Mater., vol. 10, pp. 3769-3771, 1998.
Yao et al., "Polymer/Layered Clay Nanocomposites: 2 Polyurethane Nanocomposites," Polymer, vol. 43, pp. 1017-1020, 2000.
Zehner et al., Langmuir 1998, 14, 241.
Zheng et al., J. Polym. Sci., Part B, Polym. Phys., In press, 2003.
Zilg et al., "Polyurethane Nanocomposites Containing Laminated Anisotropic Nanoparticles Derived From Organophilic Layered Silicates," Adv. Mater., vol. 11, pp. 49-52, 1999.
Ozisik et al., "Controlling Mechanical Properties of Polyurethane Via Nanoparticles," Rensselaer Nanotechnology Center, APS Presentation, 2004.

* cited by examiner

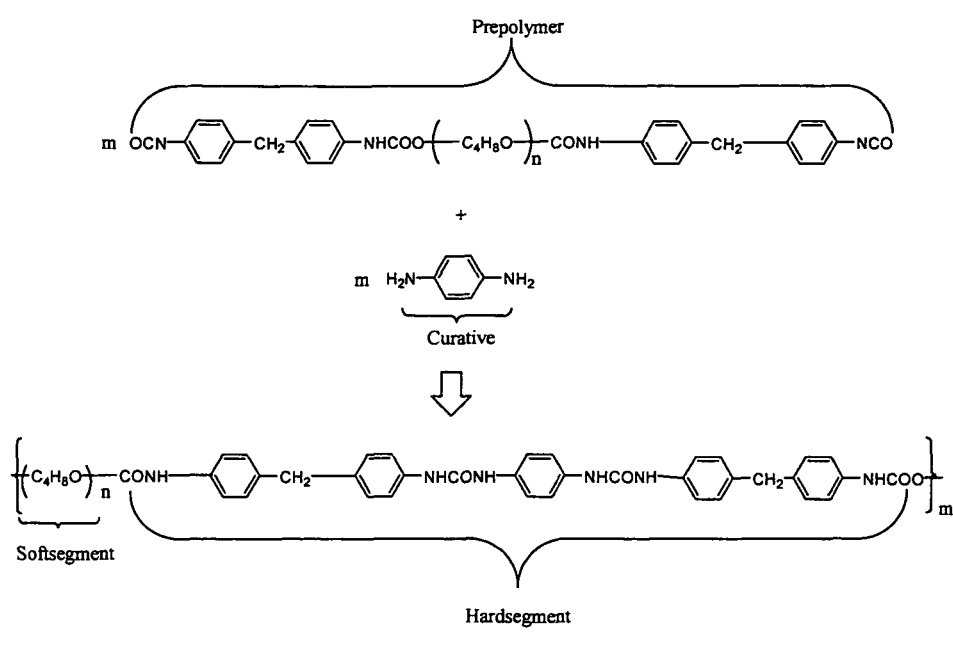
Figure 1 Reaction Scheme and Chemical Structure of PU

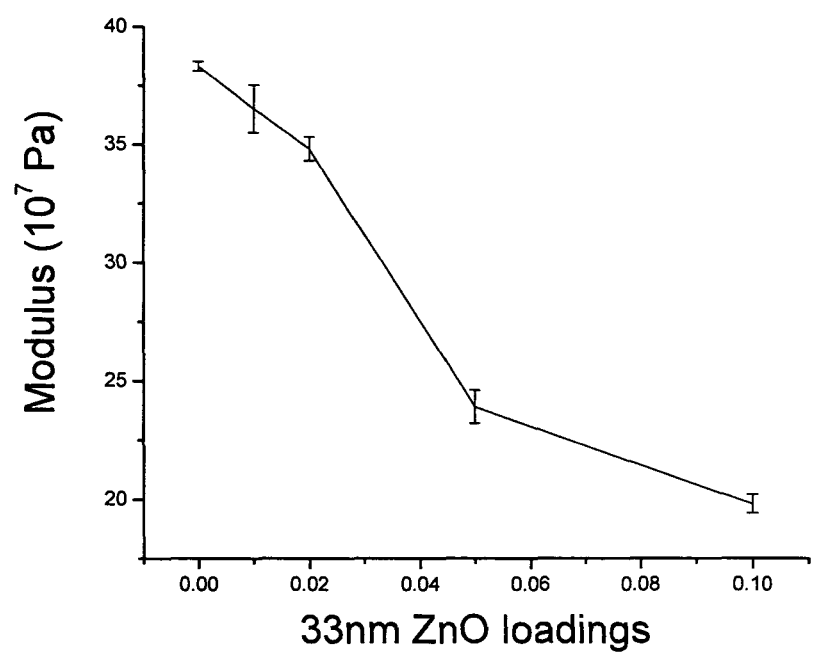
Figure 2 Young' Modulus of Samples from Tensile Tests

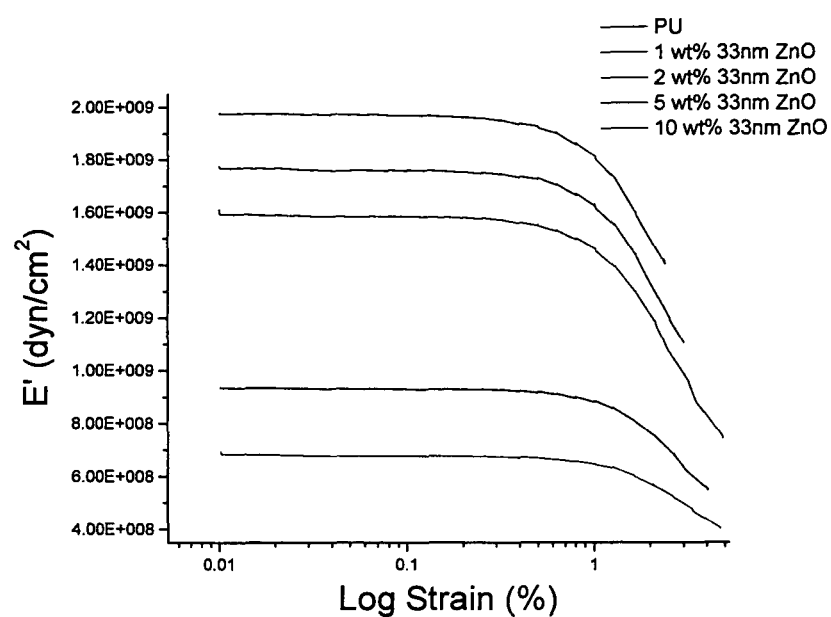
Figure 3 Storage Modulus of Samples from DMTA Tests

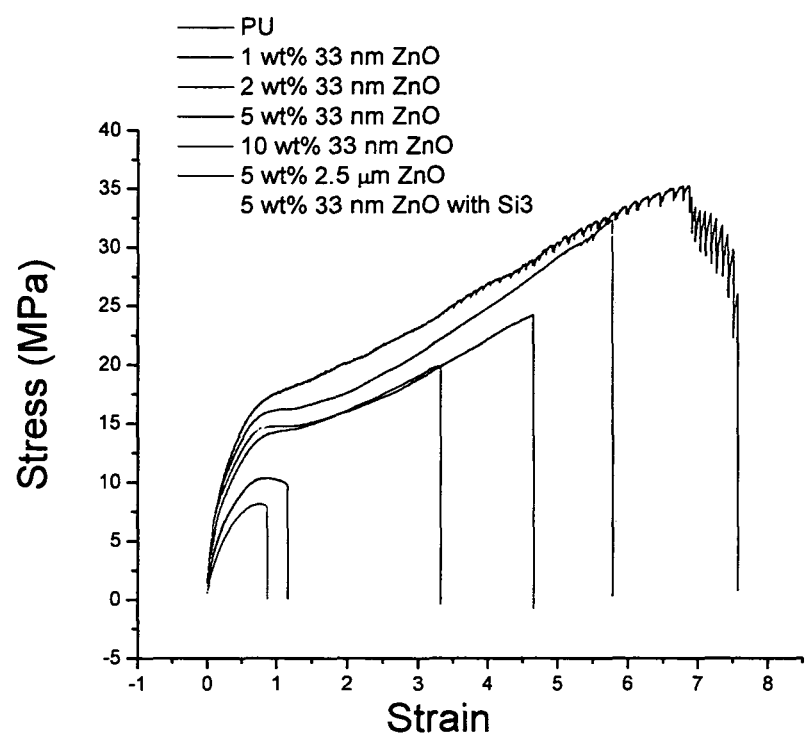
Figure 4 Stress-Strain Curves of Samples from Tensile Tests

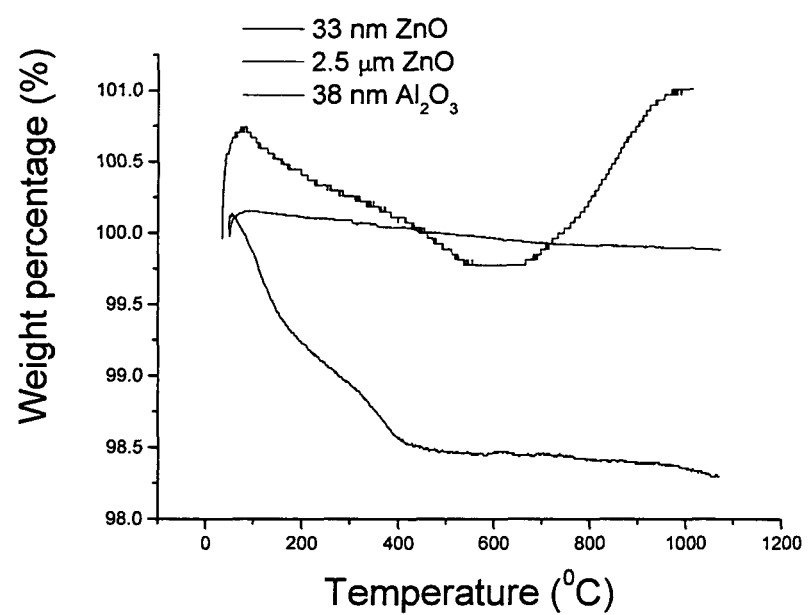
Figure 5 TGA of ZnO Particles and $Al_2O_3$ (as comparison) Particles

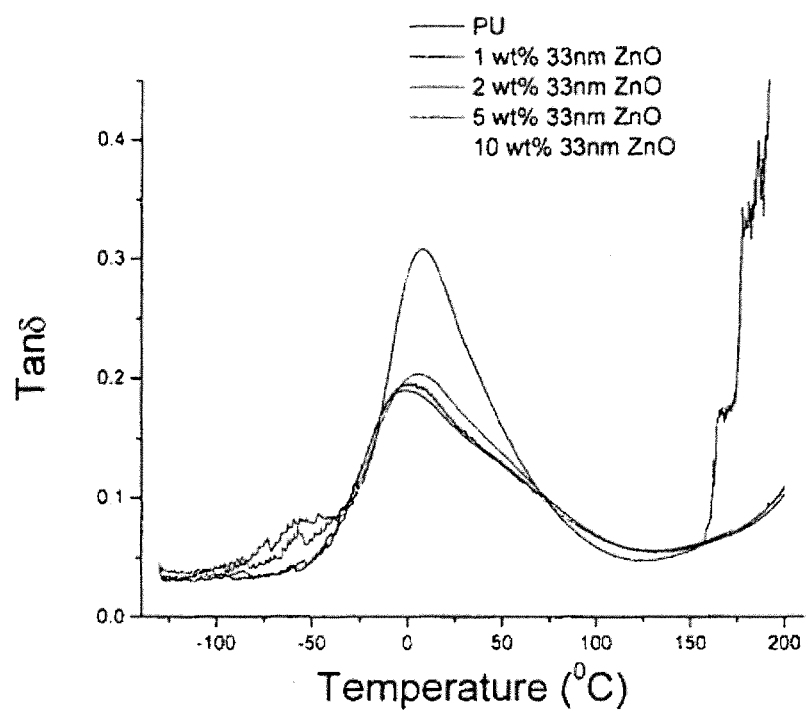
Figure 6 Tanδ of Samples from DMTA Tests

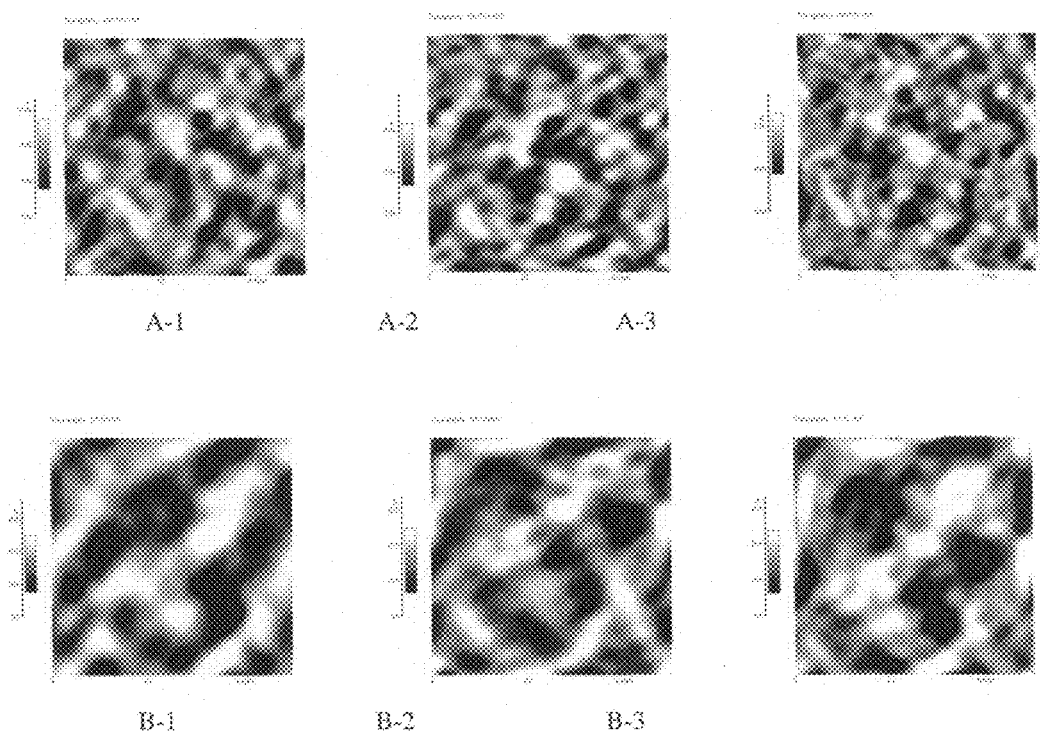
Figure 7 Topographs of Composite with 5 wt% 33 nm ZnO (A) and PU (B)
(500 nm × 500 nm. Tapping force increases from left to right. Figures in the same column were taken under the same condition)

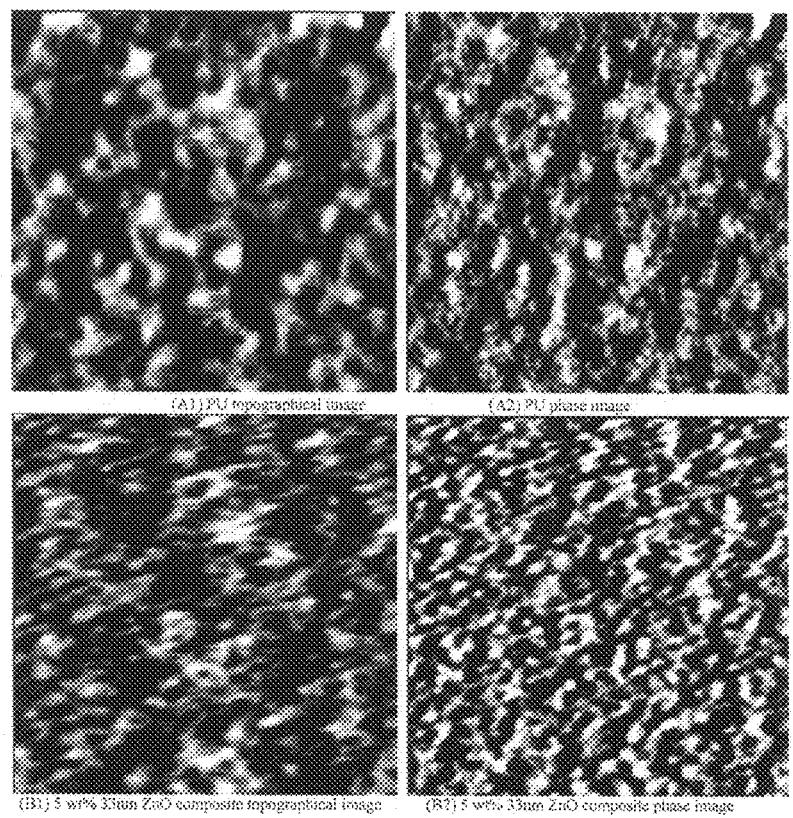
Figure 8 Topographical and Phase Data from PU and 5 wt% 33 nm ZnO Composite (Images are 1000 nm×1000 nm)

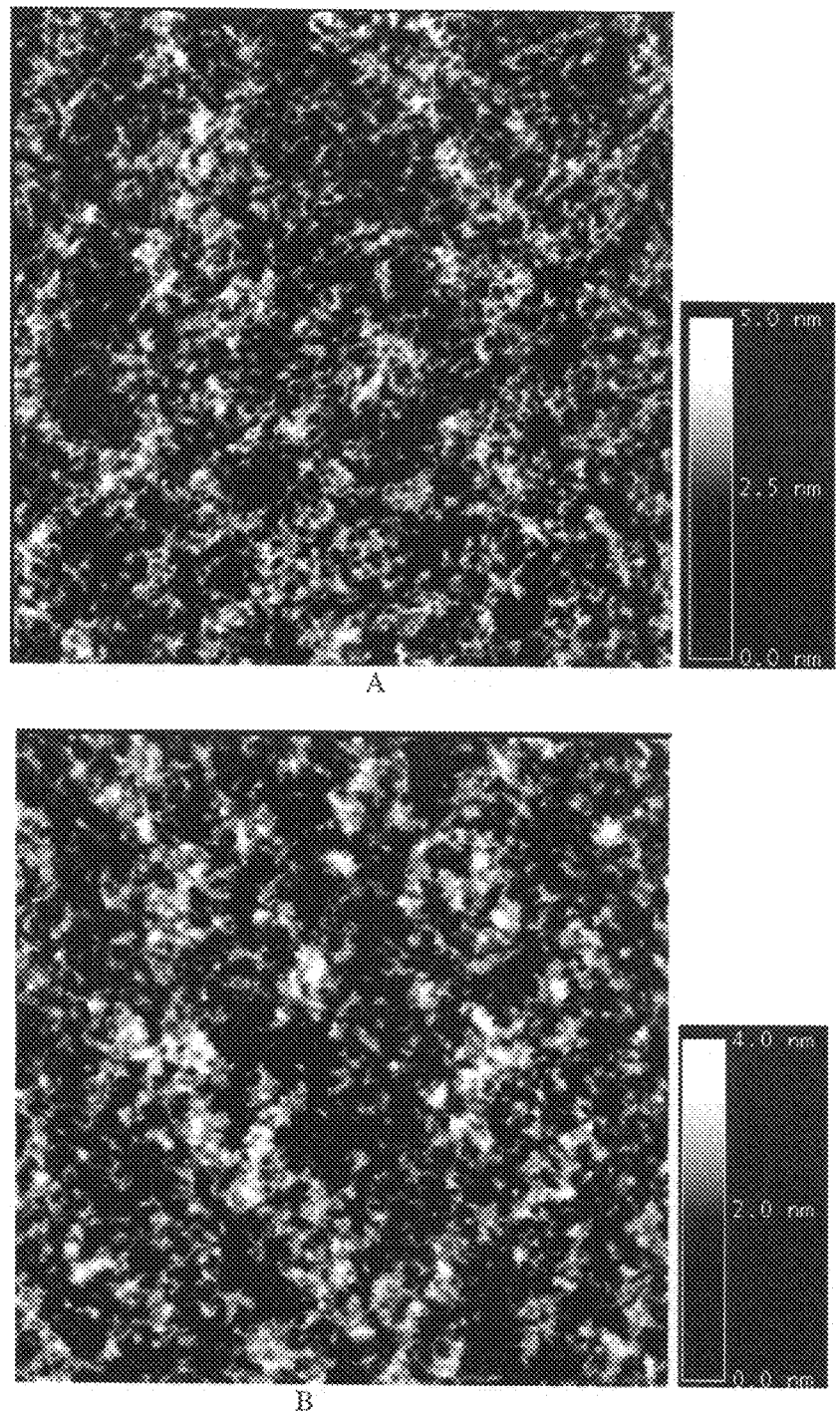
Figure 9 Topographs of PU (A) and Composite with 5 wt% 33 nm ZnO (B) in Thin Film
(Images are 1000 nm × 1000 nm)

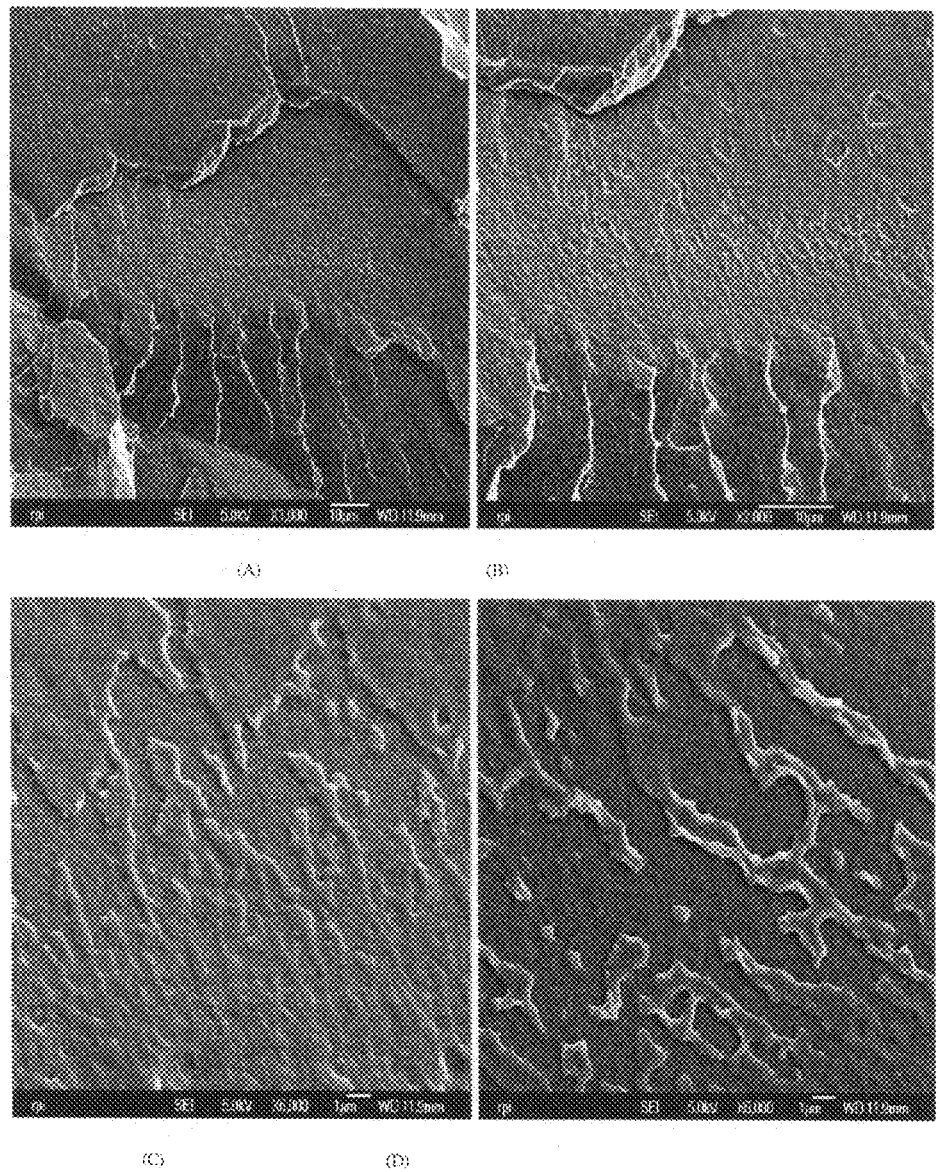
Figure 10 Cryogenic Fractographs of the Polyurethane
(A) (×1000), (B) (×2000) and (C) (×6000) are images with different magnifications of one typical flaw-growth-region (including mirror, mist and hackle regions, and (C) is the image of the region between mirror and mist in (A) and (B)). (D) (×6000) is the image of another kind of "patch".

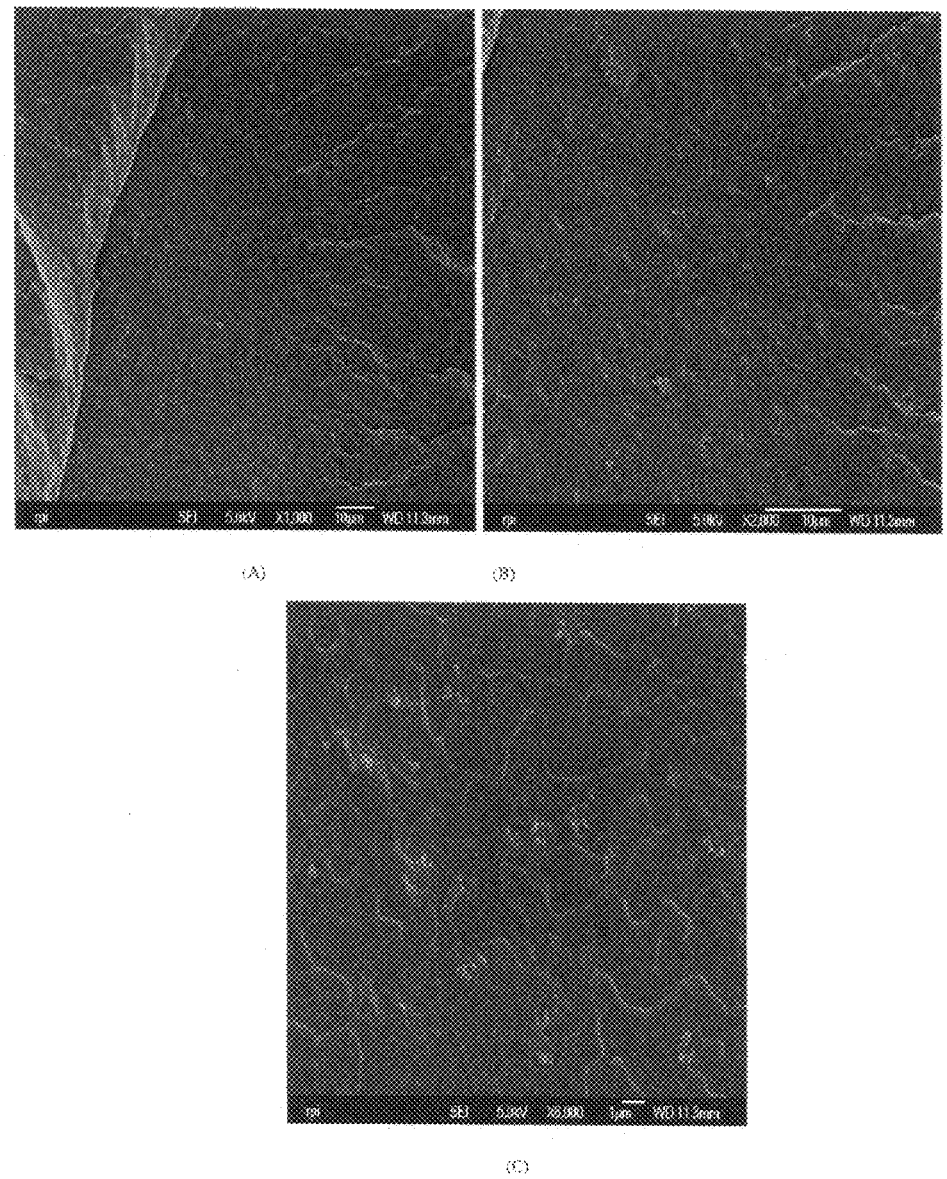
Figure 11 Cryogenic Fractographs of the Composite with 10% 2.5μm ZnO Particles
(A) (×1000), (B) (×2000) and (C) (×6000) are images with different magnifications of one typical flaw-growth-region (including mirror, mist and hackle regions, and (C) is the image of the mirror region near the mist in (A) and (B))

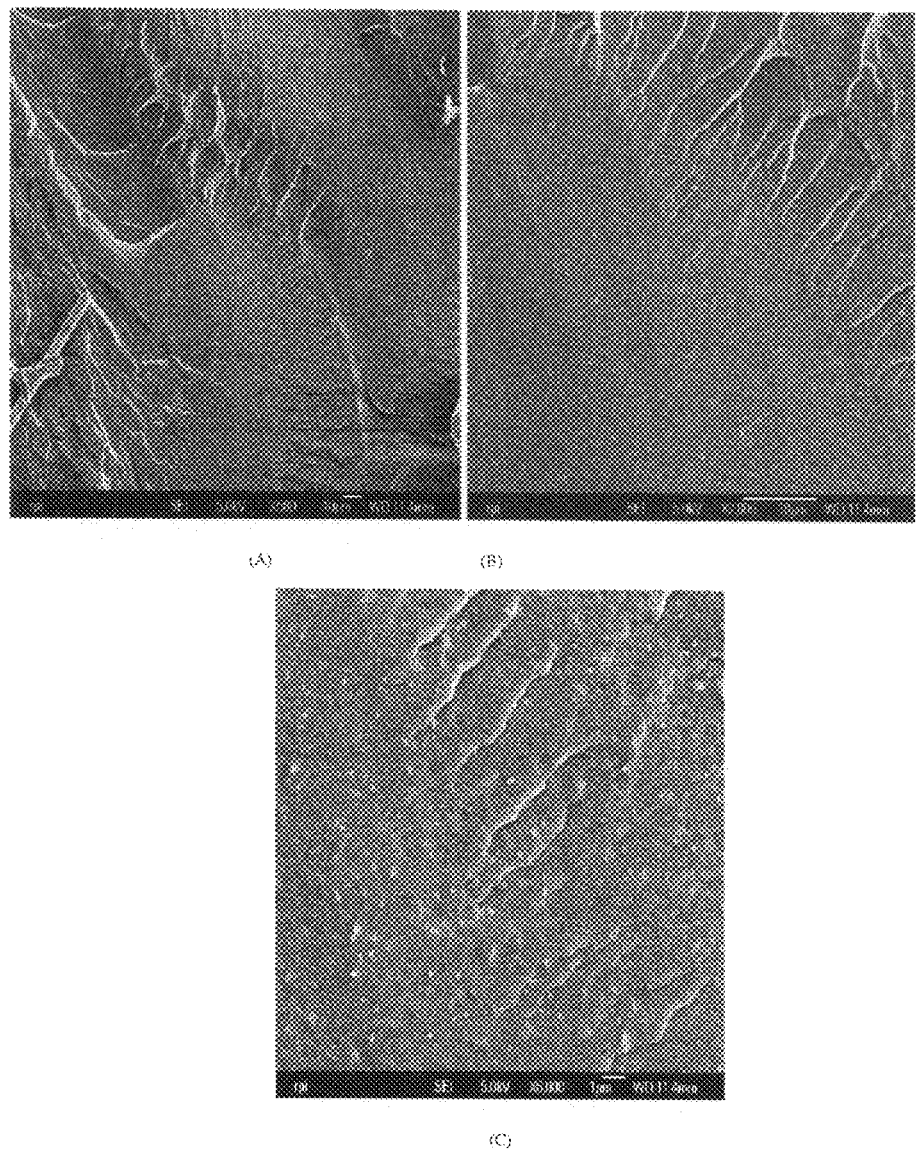
Figure 12 Cryogenic Fractographs of the Composite with 5 wt% 33 nm ZnO Particles
(A) (×500), (B) (×2000) and (C) (×6000) are images with different magnifications of one typical flaw-growth-region (including mirror, mist and hackle regions, and (C) is the image of the region between mirror and mist in A and B)

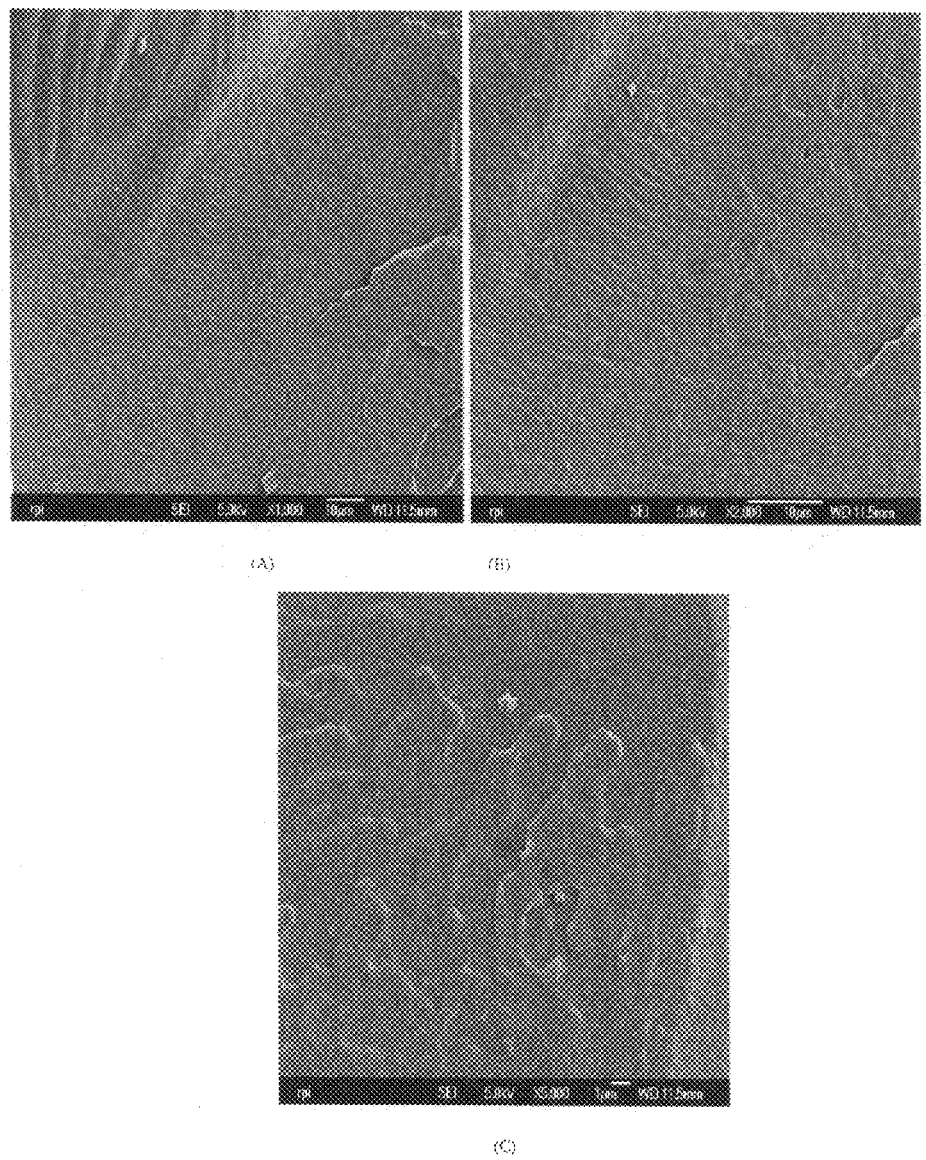
Figure 13 Cryogenic Fractographs of the Polyurethane
(A) (×1000), (B) (×2000) and (C) (×5000) are images with different magnifications of one typical flaw-growth-region (including mirror, mist and hackle regions, and (C) is the image of the region between mirror and mist in (A) and (B))

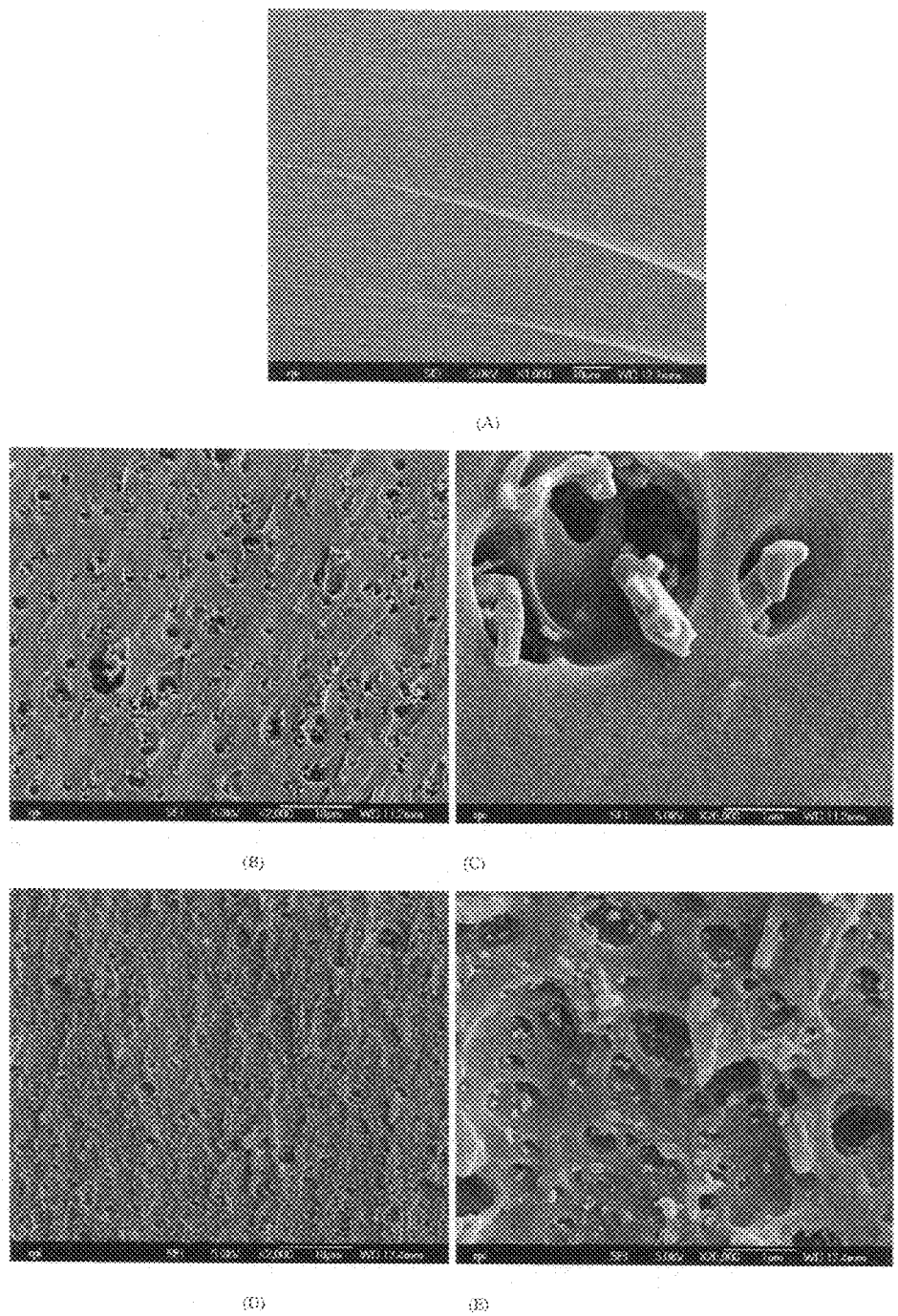
Figure 14 Ambient Fractographs of the Neat Polyurethane and Composites with ZnO Particles
(A) (×1000) is an image of PU; (B) (×2000) and (C) (×20000) are images for the composite with 10 wt% 2.5 μm ZnO particles; and (D) (×2000) and (E) (×20000) are images for the composite with 10 wt% 33 nm ZnO particles

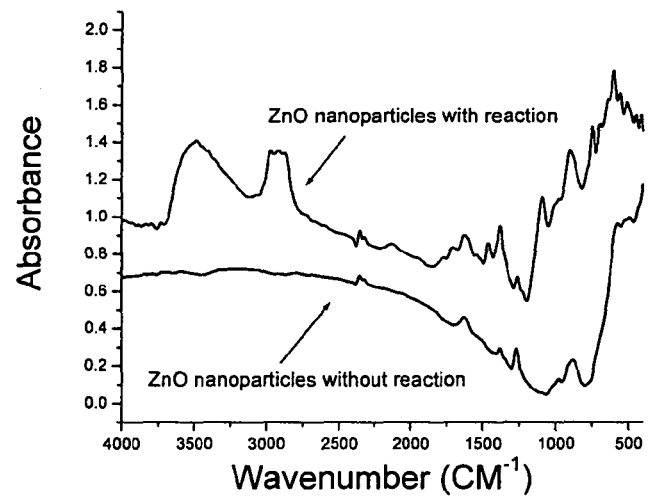
A
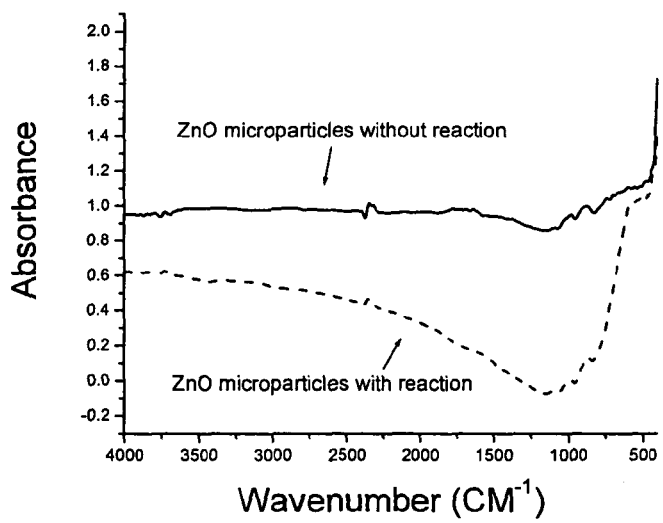
B
Figure 15 FTIR of reactions between the PU Prepolymer and ZnO 33 nm (A), 2.5 nm (B) Particles

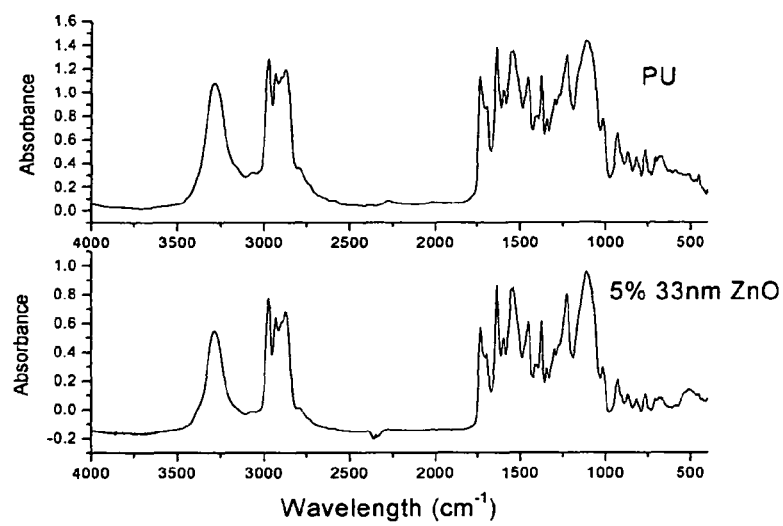
Figure 16 FTIR of PU and the Composite with 5 wt% 33 nm ZnO Particles Cured at 110°C for 24 Hours

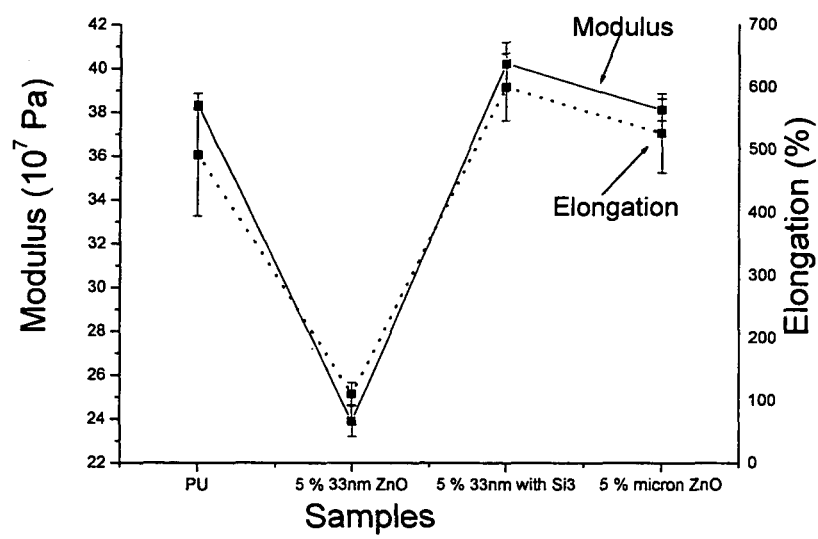
Figure 17 Tensile Test Results of PU and Samples with 5 wt% Particles Loading

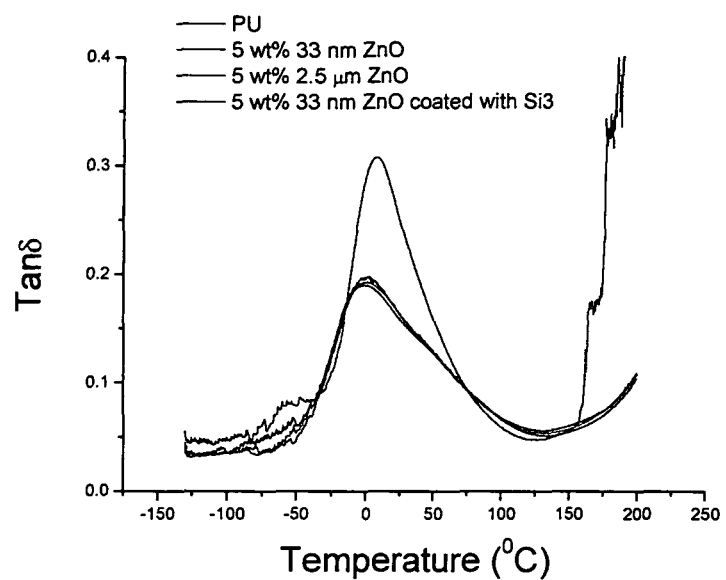
Figure 18 Glass Transition Temperatures of PU and Samples with 5 wt% Particles Loading

BLOCK COPOLYMER AND NANOFILLER COMPOSITES

The present application claims the benefit of U.S. provisional application Ser. No. 60/553,133 filed on Mar. 16, 2004, which is incorporated herein by reference in its entirety. The present invention relates generally to polymer/nanofiller nanocomposites and more particularly to controlling the polymer microstructure by selecting certain nanofillers.

BACKGROUND OF THE INVENTION

In recent years, polymer nanocomposites, which are composed of polymer matrices and nano-size fillers, attracted extensive research interests around the world. It has been found that these new kinds of materials have many advantages over the traditional ones such as increased strength without weakening other mechanical properties, decreased gas permeability, improved heat resistance, and enhanced electrical conductivity. Special interest has been focused on block copolymer/nanofiller systems, because in the general polymers/nanofillers system, until now, it is almost impossible to array nanofillers in the polymer matrices regularly, while in the block copolymers/nanofillers system, ordering of the nanofillers and thus creating highly organized hybrid materials are possible. The molecular chains of block copolymers have different segments that can self-assemble to form phase-separated microdomains. If one can make the fillers compatible with one of the phases in the block copolymer, it is possible that the fillers can segregate into the microdomains formed by this phase only and thus, the ordering of the fillers can be achieved by the self-assembling of the block copolymers. Such spatially regular materials could potentially be used in separation processes, catalysts, and photonic devices.

Although there have been some investigations into the properties of thin films of diblock copolymer/nanofiller systems, which have alternating regions of polymer-rich and particle-rich domains, systematic experimental studies to determine the factors governing the bulk morphology of copolymer/filler composites have not been undertaken yet as mentioned by Thompson et al. (R B Thompson, V V Ginzburg, M W Matsen, A C Balazs, Macromolecules 2002, 35, 1060). Most of the investigations are concentrated on the effects of the microdomains on the ordering of the fillers. Efforts to understand the effects of nanofillers on the phase-separation of the copolymers have not been reported.

BRIEF SUMMARY OF THE INVENTION

As mentioned above, block copolymers are polymers whose molecular chains consist of incompatible segments that can self-assemble to form separated phases or microdomains. They have wide industrial applications as biomedical materials, engineering thermoplastics and elastomers, and optical and electrical materials. The versatile properties and applications of block copolymers are determined by their phase-separated microdomains. Traditionally, the microdomains of block copolymer systems were controlled by changing the ratio of the blocks of the copolymer. This can strongly influence their phase separation, and thus their overall properties. From the viewpoint of practical applications, this traditional method has difficulties related to cost and customers' special requirements. Thus, a new method to modify the properties of block copolymers is desired. The inventors have discovered that combining copolymers with nanoscale fillers (metal; ceramic; organic nanoparticles such as nanotubes and nanofibers; materials that are modified such as organoclays; or a combination of these) can be the solution. By carefully modifying the surfaces of the nanoscale fillers, the inventors have found they can either chemically tether the block copolymers onto the nanofillers or through other means (such as hydrogen bonds or van der Waals forces) control the interactions between the copolymers and the nanofillers. The interactions can control the self-assembly of the phase-separated microdomains of the block copolymers and, thus, control the overall properties of the block copolymers.

In one aspect of the invention, nanoparticles (such as zinc oxide and aluminum oxide) and nanoclays with different surface chemistries are used in combination with polyurethane (PU, a block copolymer widely used in industry). The inventors have found that by adding about 5 wt % nanofillers into PU, the modulus of the PU can be decreased or increased by up to about 40% with different nanofiller surface modifications. With the use of Fourier transform infra-red (FTIR) spectroscopy, thermal gas analysis (TGA), X-ray diffraction (XRD), dynamic mechanical thermal analysis (DMTA), atomic force microscopy (AFM), and field-emission scanning electron microscope (FESEM), the inventors have found that: (i) the self-assembly of the phase-separated domains in PU was changed and directed by the nanofillers; (ii) the extent of the influence of the nanofillers can be controlled by their type, size, and their surface chemistry; and (iii) addition of the nanofillers affect the elastic modulus, elongation, and fracture behavior of the PU. This new method can be used to modify and control the bulk morphology and properties of copolymers, thereby extending their applications to a wide variety of commercial uses.

In one aspect, the invention relates to a nanocomposite composition comprising a block copolymer and a nanofiller having a characteristic suitable for controlling the microstructure of the copolymer. In a preferred embodiment, the nanofiller is ceramic nanoparticles (e.g., ZnO, $Al_2O_3$, and $TiO_2$), carbon nanotubes (single-walled and multi-walled), metal nanoparticles, organic nanoparticles, nanofibers, or nanolayered materials (e.g., clays) or mixtures thereof.

In another aspect, the invention relates to a nanocomposite composition comprising a polyurethane (PU) block copolymer and ZnO nanoparticles.

In yet another aspect, the invention relates to a nanocomposite composition comprising a PU block copolymer and ZnO nanoparticles, where the ZnO nanoparticles are compatible to a phase in the block copolymer and where the ZnO nanoparticles segregate into microdomains formed by said phase in the block copolymer thereby ordering the ZnO nanoparticles.

In still another aspect, the invention relates to a nanocomposite composition comprising a PU block copolymer wherein the microstructure of said block copolymer is controlled by a nanofiller.

In yet another nanocomposite composition comprising a PU block copolymer and ZnO nanoparticles, wherein the glass transition temperature ($T_g$) of the PU increases with increasing ZnO nanoparticle loading.

In another aspect, the invention relates to a nanocomposite composition comprising a PU block copolymer and ZnO nanoparticles, wherein the storage modulus or the Young's modulus of the PU decreases with increasing ZnO nanoparticle loading.

In still another aspect, the invention relates to a nanocomposite composition comprising a PU block copolymer and ZnO nanoparticles, wherein the $T_g$ and the storage modulus of the PU is controlled simultaneously by a nanofiller.

In another aspect, the invention relates to a method of making a nanocomposite composition comprising a block copolymer and a nanofiller, comprising:
  (a) providing block copolymer precursors;
  (b) selecting a nanofiller based on a characteristic suitable for controlling the microstructure of the copolymer;
  (c) combining said block copolymer precursors and said nanofiller; and
  (d) polymerizing said block copolymer precursors;
  thereby producing said nanocomposite composition comprising a block copolymer and a nanofiller, wherein said block copolymer has a controlled microstructure.

In yet another aspect, the invention relates to a method for controlling the glass transition temperature and the modulus of a block copolymer comprising a nanofiller, comprising:
  (a) providing block copolymer precursors;
  (b) selecting a nanofiller based on a characteristic suitable for controlling the $T_g$ and the storage modulus of the copolymer;
  (c) combining said block copolymer precursors and said nanofiller; and
  (d) polymerizing said block copolymer precursors;
  thereby producing said nanocomposite composition comprising a block copolymer and a nanofiller, wherein said block copolymer has a controlled glass transition temperature and modulus.

In a final aspect, the invention relates to a nanocomposite composition comprising a block copolymer and a means for controlling the microstructure of said block copolymer.

BRIEF DESCRIPTION OF THE DRAWINGS

FIG. 1 shows a reaction scheme and chemical structure for a diamine cured PU with polyether as soft segments.

FIG. 2 is the Young's Modulus of the neat PU and its composites with different ZnO nanoparticles loadings from tensile tests.

FIG. 3 is the storage modulus vs. strain for samples from DMTA tests.

FIG. 4 shows stress-strain curves of samples from tensile tests.

FIG. 5 shows TGA of ZnO Particles and $Al_2O_3$ (as comparison) particles.

FIG. 6 shows the dependence of Tan δ on the temperature for PU and its ZnO nanocomposites.

FIG. 7 shows AFM topographs of composite with 5 wt % 33 nm ZnO (A) and neat PU (B); 500 nm×500 nm; tapping force increases from left to right; figures in the same column were taken under the same conditions.

FIG. 8 shows topographical and phase data (image size 1000 nm×1000 nm) recorded at the same time with another AFM (MultiMode Scanning Probe Microscope, Digital Instruments).

FIG. 9 shows images of thin films samples (PU and 5 wt % 33 nm ZnO composite) that were produced by spin coating at 3000 rpm from 10 wt % solutions.

FIG. 10 shows cryogenic fractographs of PU; (A) (×1000), (B) (×2000) and (C) (×6000) are images with different magnifications of one typical flaw-growth-region (including mirror, mist and hackle regions, and (C) is the image of the region between mirror and mist in (A) and (B)); (D) (×6000) is the image of another kind of "patch."

FIG. 11 shows cryogenic fractographs of the composite with 10% 2.5 µm ZnO particles; (A) (×1000), (B) (×2000) and (C) (×6000) are images with different magnifications of one typical flaw-growth-region (including mirror, mist and hackle regions, and (C) is the image of the mirror region near the mist in (A) and (B)).

FIG. 12 shows cryogenic fractographs of the composite with 5 wt % 33 nm ZnO particles; (A) (×500), (B) (×2000) and (C) (×6000) are images with different magnifications of one typical flaw-growth-region (including mirror, mist and hackle regions, and (C) is the image of the region between mirror and mist in A and B).

FIG. 13 shows cryogenic fractographs of neat PU; (A) (×1000), (B) (×2000) and (C) (×5000) are images with different magnifications of one typical flaw-growth-region (including mirror, mist and hackle regions, and (C) is the image of the region between mirror and mist in (A) and (B)).

FIG. 14 shows ambient fractographs of the neat PU and the composites.

FIG. 15 is the FTIR of products of the PU prepolymer reacting with ZnO 2.5 µm and 33 nm particles.

FIG. 16 is the FTIR of PU and the composite with 5 wt % 33 nm ZnO particles cured at 110° C. for 24 hours.

FIG. 17 shows tensile test results of neat PU and composite samples with 5 wt % filler loading.

FIG. 18 shows glass transition temperatures of neat PU and composite samples with 5 wt % filler loading.

DETAILED DESCRIPTION OF THE EMBODIMENTS

The inventors have found that the choice of nanofillers in a block copolymer/nanofiller nanocomposite has an effect on the microstructure and the bulk morphology of a block copolymer. Further, they have found that the choice of nanofiller effects changes on the mechanical responses of the block copolymer. The inventors have found that they can control the phase-separation and the bulk morphology of a block copolymer, and thus the mechanical responses of the block copolymer, by carefully selecting the nanofiller. For example, the inventors have found that they can simultaneously control the glass transition temperature ($T_g$) and the storage and/or Young's modulus of the block copolymer by selecting the specific nanofiller characteristic(s). In some instances, the inventors have been able to increase the $T_g$ of the block copolymer by about 10° C. or more, while simultaneously decreasing the storage modulus up to about 60% relative to the same block copolymer that contains no nanofiller.

Thus, in one aspect, the invention relates to a block copolymer/nanofiller nanocomposite which, as a result of the selected nanofiller, has an increase in $T_g$ of at least about 5° C., such as 10° C. to about 20° C.; and a simultaneous decrease of the storage and/or Young's modulus that is up to about 15%, up to about 20%, up to about 25%, up to about 30%, up to about 40%, up to about 45%, up to about 50%, up to about 55%, up to about 60%, up to about 65%, up to about 70%, up to about 75%, up to about 80%, up to about 85%, up to about 90%, up to about 95%, or up to about 100% relative to the same block copolymer that contains no nanofiller.

In another aspect, therefore, the invention relates to nano-size and micron-size nanofillers which, when combined with a block copolymer, give a block copolymer/nanofiller nanocomposite of the preferred embodiments of the present invention. FTIR may be used to monitor the reaction extent and functional group changes of the samples. AFM may be used to measure the phase-separated microdomains in both the neat block copolymer and composites. FESEM may be used to measure the fracture behaviors (both cryogenic and ambient) of the samples. DMTA and tensile tests may be used to measure the mechanical responses of the samples.

To prepare the block copolymer/nanofiller nanocomposites of the preferred embodiments of the present invention, nano-size and micron-size particles of the nanofiller are selected based on their characteristics, including but not limited to size, type, chemical properties (e.g., reactive sites, such as oxygen atoms that may be bound to a silane; chemical groups and their affinity to different phases) and, optionally, their water content. The nanofiller is selected based on a characteristic suitable for controlling the microstructure of the copolymer to achieve a desired phase-separation and bulk morphology of a block copolymer and thereby effect changes on the mechanical responses of the block copolymer. The nanofiller is preferably combined with the block copolymer precursors before the block copolymer precursors polymerize.

As used herein, "microstructure" refers to the microdomains within the block copolymer. The block copolymer microdomains are the phase-separated hard-segment domains, phase-separated soft-segment domains and hard phase self-assembled microdomains. Further, "control microstructure" refers to any one of the following, or combinations thereof: (a) controlling the presence or absence of a microdomain within the block copolymer; (b) controlling the size of microdomain within the block copolymer; (c) controlling the microdomain ratio.

Non-limiting examples of nanofillers that may be used in the preferred embodiments of the present invention are nanofillers whose particles have an average diameter of less than about 500 nm, preferably from about 2 nm to about 100 mn, from about 2 nm to about 75 nm, from about 2 nm to about 50 nm, from about 2 nm to about 40 nm, from about 2 nm to about 30 nm or from about 30 nm to about 40 nm.

Non-limiting examples of nanofillers used in the preferred embodiments of the present invention are ceramic nanoparticles (e.g., ZnO, $Al_2O_3$, and $TiO_2$), carbon nanotubes (single-walled and multi-walled), metal nanoparticles, organic nanoparticles, nanofibers, Teflon nanoparticles and nanolayered materials (e.g., clays) or mixtures thereof.

In one aspect, the nanofillers may be coated or uncoated. When the nanofillers are coated, they may be coated with, a coating such as for example a silane. Exemplary silanes include trialkyl silanes, trialkoxysilanes, triarylsilanes, tetralakyl silanes, tetraalkoxy silanes, tetraaryl silanes, and trialoxy aminoalkylamino silanes. In this context, the term "alkyl" refers to branched or unbranched $C_1$-$C_{20}$ alkyl, $C_1$-$C_5$ alkyl or $C_1$-$C_3$ alkyl groups (e.g., methyl, ethyl, propyl, butyl, pentyl, hexyl, heptyl, nonyl, decyl, undecyl and the like, as well as isopropyl, isobutyl, isopentyl, neopentyl and the like); "aryl" refers to phenyl; and "amino" refers to $NH_2$ or $NR_1R_2$, where $R_1$ and $R_2$ are independently hydrogen or alkyl. The branched or unbranched $C_1$-$C_{20}$ alkyl, $C_1$-$C_5$ alkyl or $C_1$-$C_3$ alkyl groups may be optionally substituted with halogen (e.g., fluorine, chlorine and bromine) or amino.

When preparing a coated nanofiller, the coated nanofiller particles are preferably not dried, as drying may promote agglomeration of the nanofiller particles.

In addition to being coated or uncoated, in another aspect, the nanofillers may be modified or unmodified. The nanofillers may be modified, for example, with an ammonium salt modifier. Exemplary ammonium salt modifiers include salts of the formula:

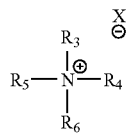

where $R_3$-$R_6$ are independently alkyl, hydroxyalkyl (i.e., HO-alkyl) or aminoalkyl and X is chloride or tetrafluoroborate. In a preferred embodiment, $R_3$ and $R_4$ are methyl and $R_5$ and $R_6$ are long alkyl chains wherein said long alkyl chains comprise about 65% $C_{18}$, about 30% $C_{16}$ and about 5% $C_{14}$. In another preferred embodiment, the $R_3$ and $R_4$ are hydroxyl ethyl and $R_5$ is methyl and $R_6$ is a long alkyl chains wherein said long alkyl chains comprise about 65% $C_{18}$, about 30% $C_{16}$ and about 5% $C_{14}$. In yet another preferred embodiment, the ammonium salt modifier comprises about 30-38% of the nanofiller by weight.

Non-limiting examples of polymers used in the preferred embodiments of the present invention are polyolefins, polyhalides, vinyl polymers, polyurethanes, polyamides, polyimides, poly acrylic acid, polyacrylates, polyacrylamides or polysiloxanes, polycarbonates, polyphosphazenes, heterocyclic polymers, polyacrylonitrile, polyvinyl chloride, conjugated polymers, electrically conducting polymers and mixtures thereof.

In a preferred embodiment, the polymer is PU and the nanofiller is ZnO particles. As mentioned above, PU is an important industrial material with wide applications. It is a multiblock copolymer, which forms phase-separated hard-segments domains and soft-segments domains. A typical reaction scheme and chemical structure for a diamine cured PU with polyether as soft-segments is shown in FIG. 1. In PU, the hard-segments domains act as crosslinking points and reinforcing fillers. Although PU/clay nanocomposites have been widely studied, most of these studies concentrate on the relationship between the surface modifications, exfoliation or intercalation (monitored with wide angle XRD and TEM methods) of the clays, and the mechanical properties of the composites. Because of the difficulty of exfoliation of the clays, each study reports quite different mechanical results. None of these studies focuses on the mechanical responses with the morphology change in the copolymer.

In another aspect, the invention relates to a nanocomposite composition comprising a PU block copolymer and ZnO nanoparticles, wherein the glass transition temperature ($T_g$) of the PU increases with increasing ZnO nanoparticle loading.

In a further aspect, the invention relates to a nanocomposite composition comprising a PU block copolymer and ZnO nanoparticles, wherein the storage modulus or the Young's modulus of the PU decreases with increasing ZnO nanoparticle loading.

In a preferred embodiment, the invention relates to a nanocomposite composition comprising a PU block copolymer and ZnO nanoparticles, wherein the $T_g$ and the storage modulus of the PU is controlled simultaneously by a nanofiller.

In yet another aspect, the invention relates to a nanocomposite composition comprising a block copolymer and a means for controlling the microstructure of said block copolymer. Means for controlling the microstructure of said block copolymer include nanoparticulate ZnO, nanoparticulate $Al_2O_3$, nanoparticulate $TiO_2$, carbon nanotubes (single-walled and multi-walled), metal nanoparticles, ceramic nanoparticles, organic nanoparticles, nanofibers, and nanolayered materials (e.g., clays) or mixtures thereof.

Having now generally described this invention, the same will be understood by reference to the following examples, which are provided herein for purposes of illustration only and are not intended to be limiting unless otherwise specified.

EXAMPLES

Example 1

Sample Preparation

Typical procedure for composites: Equal molar ratio of a degassed PU prepolymer (TDI-PPG Prepolymer; wt % NCO is 6.32; Airthane® PPT-95A Prepolymer; Air Products) and a diamine curative (aromatic diamine; Lonzacures MCDEA Curative; Air Products) were dissolved in purified THF to form 15% solution at 25° C. ZnO particles (used as received; nano-size=33 nm; Nanophase Technologies Corporation; micron-size=~2.5 µm; Atlantic Equipment Engineers) were dispersed in THF to form a 10% solution with a sonicator-solutions that contain 10-20% ZnO may also be used. The two solutions were combined together and sonicated for 20 min in ice/water bath. Subsequently the mixture was concentrated to 60% solution. The solution was cast into moulds and cured at 40° C. for 8 h, and then cured at 110° C. for 24 h to form thin films with different thickness from 0.2 to 1 mm. The preparation of neat PU uses a similar procedures.

In general, the common preparation procedure of the polymer system used is melt mixing, but it was found that, because the pot-time was very short (about 1 minute), it may be difficult to disperse the curative into the prepolymer. Thus, performing experiments by melt mixing is difficult. The storage modulus of the sample prepared with melt mixing was about 1/5-1/10 of that of the sample (same molar ratio of the prepolymer and the curative) prepared using solution chemistry as described above. The solution chemistry method mentioned above assures that the curative is thoroughly mixed with the prepolymer. Left-over solvent from the reaction is not a problem in this case, since the solvent may be completely removed. For example, a cured sample (the thickest, 1 mm) was placed in a vacuum oven and heated under vacuum at 120° C. for 48 hours. TGA, FTIR and DMTA did not show any differences between samples that were heated under vacuum and those that were only cured at 110° C. for 24 h. These results suggest that the solvent has been removed. Such a result is quite different from nylon 6/2,2,2-trifluoro-ethanol samples. Such samples were not completely dry even upon heating under vacuum. Such differences may be attributed to the different interaction between the solvent and the polymer.

A suitable curing time may be determined using FTIR to monitor the reaction extent, by the intensity of the isocyanate peak at ~2270 cm$^{-1}$. A suitable curing time was 24 hours. Above 24 hours, the isocyanate peak almost disappears and its intensity doesn't change.

Example 2

DMTA and Tensile Tests

The mechanical responses of samples were measured with a DMTA (DMTA V, Rheometric Scientific) and Instron 8562. Two kinds of DMTA measurements were performed: 1, Dynamic (1 Hz, 6.2832 Rad/s) strain sweep at room temperature (21° C.); 2, Dynamic (1 Hz, 6.2832 Rad/s) temperature ramp sweep at 0.1% strain and 2° C./min rate from −130° C. to 200° C. Tensile tests were performed to give the Young's Modulus and elongation of samples. Each data point is averaged from 3-6 samples.

FIG. 2 is the Young's Modulus of the neat PU and its composites with different ZnO nanoparticles loadings from tensile tests. FIG. 3 is the storage modulus vs. strain for samples from DMTA tests. All these tests were performed at around 21° C. All detailed DMTA and tensile tests data are listed in Table 1.

TABLE 1

Data from Tensile Tests and DMTA Tests

| Material | Tg (0° C.) | Storage Modulus (10$^7$ Pa; 0.1%) | Young' Modulus (10$^7$ Pa) | Elongation (%) |
|---|---|---|---|---|
| PU | 2.9 | 19.6 | 38.3 ± 0.2 | 492 ± 98 |
| 1 wt % 33 nm ZnO | 0 | 17.6 | 36.5 ± 1 | 372 ± 93 |
| 2 wt % 33 nm ZnO | 4.7 | 15.8 | 34.8 ± 0.5 | 423 ± 93 |
| 5 wt % 33 nm ZnO | 8.3 | 9.3 | 23.9 ± 0.7 | 110 ± 18 |
| 10 wt % 33 nm ZnO | 11.2 | 6.8 | 19.8 ± 0.4 | 88 ± 8 |
| 5 wt % 2.5 µm ZnO | −2.1 | 19.1 | 38.1 ± 0.5 | 526 ± 63 |
| 5 wt % 33 nm ZnO with Si$_3$ | −0.8 | 16.9 | 40.2 ± 1 | 600 ± 54 |

FIGS. 2 and 3 clearly show that both Young's modulus and storage modulus decrease with the increase of ZnO nanoparticles loading. For the composite with 5 wt % (less than 0.8 vol %) 33 nm ZnO, the Young's Modulus decreases for about 38% and the storage modulus decreases for about 52% (for the linear region), compared to those of the pure PU. For the composite with 5 wt % ~2.5 µm ZnO, both moduli do not change at all, compared to those of pure PU. More dramatic change in the nanocomposites is the elongation (strain), shown in FIG. 4. The elongation of neat PU is around 500%, while that of the nanocomposite with 5 wt % 33 nm ZnO is only around 100%. These results indicate that lower modulus and smaller elongation are observed within the same sample.

Without being bound by theory, an explanation for lower modulus and smaller elongation observed within the same sample is that theses decreases in modulus and elongation in the nanocomposites is that adding ZnO nanoparticles changes the stoichiometry between the prepolymer and curative of PU, because the hydroxyl groups on the ZnO nanoparticles can probably react with the prepolymer, and thus ZnO acts as a curative. Some references (see C Hepburn Polyurethane Elastomers, Elsevier Science Publishers LTD, Essex, England, 1992; R A Beck, R W Truss, Polymer, 1999, 40, 307) report that changing the stoichiometry changed the mechanical properties of PU. In this case, it seems that stoichiometry is not an issue. PU was made with different stoichiometries (94%, 100%, and 106%), and DMTA tests did not show any differences among them. Furthermore, since there is almost no surface water on the ZnO given by TGA (in air), shown in FIG. 5, it can be assumed that at most there is 1 wt % of surface water (or hydroxyl groups) on ZnO nanoparticles. If all these water or hydroxyl groups can react with the prepolymer of PU, the molar ratio of these hydroxyl groups to the prepolymer in the composite with 5 wt % 33 nm ZnO is about 3:100. In other words, it seems that adding 5 wt % 33 nm ZnO changes the stoichiometry at most 3%, which in fact will not change the mechanical properties of PU.

According to the fact that both Young's and storage moduli of the composites decrease with the increase of ZnO nanoparticles loading, it was expected that the glass transition temperature (T$_g$) of the polymer would also decrease with the increase of ZnO nanoparticles loading, because T$_g$ is generally inversely proportional to the polymer chain mobility. Higher $T_g$ represents lower chain mobility, which generally means that the polymer is more difficult to deform—higher modulus, for a typical kind of homopolymer. An opposite result was observed in this case: for the composite with higher ZnO nanoparticles loading, a smaller modulus and higher $T_g$, were observed as shown in FIG. 6. FIG. 6 shows the dependence of Tan δ on the temperature for PU and its ZnO nanocomposites. The peak position around 0° C. can represent the $T_g$ of PU soft-segments. Detailed data are listed in Table 1.

All the tensile tests and DMTA results suggest that there must be something unexpected in the microstructures of these PU/ZnO nanocomposites. Since stoichiometry does not seem to play a role in the microstructure of the PU/ZnO nanocomposites, it is believed that the phase separation of PU plays a role in the microstructure. As mentioned above, there are two phases—hard and soft phases in PU, and the hard phases act as reinforcing fillers and deformably physical crosslinking points. It is likely that adding ZnO nanoparticles disrupts the phase separation of PU so that there are much less hard phases formed in the composites because of the reaction between the prepolymer and the surface hydroxyl groups of ZnO nanoparticles. Because there are many hydroxyl groups on the surface of any single ZnO nanoparticle, every single nanoparticle acts as a chemical crosslinking point, which constrains the chain mobility of the polymer, and thus limits the formation of phase separation. The result are that in the nanocomposites, less hard phases formed, which leads to lower modulus, and more undeformably chemical crosslinking points instead of deformably physical crosslinking points formed, which leads to higher $T_g$ and smaller elongation.

Example 3

AFM Measurements

The AFM (Autoprobe CP; Park Scientific Instruments; with tip, ultralevel D; spring constant ~18N/m; and Multi-Mode Scanning Probe Microscope; Digital Instruments) measurements were conducted at room temperature using the tapping mode with different forces. The samples were neat PU and the composite with 5 wt % 33 nm ZnO in films of (1) 500 μm thickness and (2) less than 1 μm (10 wt % THF solutions were spin coated at 3000 rpm) on silicon wafers.

AFM was used to determine the microstructures of PU and composites. Until now real space characterization of the phase-separated morphology in PU is still a challenging task. Transmission electron microscopy (TEM) studies on stained films have yielded some insight, but the experiments are limited by the efficacy of the staining, the kind of the PU and the possibility of the electron beam damage. In recent years, atomic force microscopy (AFM) has been used to image the microdomains in the PUs. In PUs, the mechanical properties (such as hardness and modulus) of the hard domains and the soft domains are quite different, and such a mechanical difference can be translated into a force difference in the AFM tapping mode measurements. Thus, an image of the phase separation can be formed in this way.

FIG. 7 is the topograph images of the composite with 5 wt % 33 nm ZnO and PU taken from Autoprobe CP AFM. The upper 3 images are of the composite (tapping force increases from left to right). The lower 3 images are of the neat PU. The 2 images in the same column were recorded under the same measuring conditions. From these images it seems that the sizes of the hard domains (the bright area) in the neat polymer are much larger than in the composite. McLean et al. (R S McLean, B B Sauer, Macromolecules 1997, 30, 8314) found that for thermoplastic PU, the AFM topographical and phase images are quite similar because of a thin, soft segment layer that covers the first few angstroms of the surface due to its lower surface energy compared with the hard segments.

To make sure that the topographic data can represent the phase-separation, the topographical and phase data were recorded at the same time with another AFM (MultiMode Scanning Probe Microscope, Digital Instruments). Images are shown in FIG. 8 (size 1000 nm×1000 nm). The topographical and phase images are similar, and it seems that the phase images give more information about the microstructures of PU. From FIG. 8, in pure PU, it looks like that the phase-separation has two steps: (1) the hard-segments of our thermoset PU form hard domains of about 10 nm width, which are similar to McLean's results for thermoplastic PU; and (2) these hard domains self-assemble to form larger microdomains of about 100 to about 400 nm length and about 50 nm width. In the 5 wt % 33 nm ZnO composite, hard-segments also form hard domains, but the number of the hard domains is less than that in the neat PU, and these hard domains can not self-assemble to form the larger microdomains. While not being bound by theory, the change of microstructure in the composite may be a key reason for the mechanical changes of the composite.

The images in FIG. 8 were taken from the thick films (~500 μm), which are quite different from those of McLean's results for thin films. To make a comparison and to make sure our measurements on the thick films are right, images of the samples (PU and 5 wt % 33 nm ZnO composite) were taken of thin films spin coated at 3000 rpm from 10 wt % solutions. Images are shown in FIG. 9. The two images were taken under the same conditions. In this case, ~10 nm thick lamellae can be clearly seen in FIG. 9, but the self-assembly into larger scale phases can not be seen. Comparing FIGS. 9A and B, it is apparent that in the composite, the number and the length of the lamellae are much smaller than those in the neat PU. These images confirm that the addition of ZnO nanoparticles disrupts the phase separation in PU.

Example 4

FE-SEM Measurements

SEM images provide information about the microstructure of the nanocomposites of the preferred embodiments of the present invention. Fractographs were measured with a FE-SEM (JEOL JSM-6330F Field Emission SEM). Samples were prepared in two ways: for cryogenic fracture, samples (~0.5 mm thick) were dipped into liquid nitrogen (−193° C.; well below $T_g$ of PU's soft-segments) for 20 minutes, and then broken (bending mode) in liquid nitrogen with two pliers; for ambient fracture, pre-notched samples (0.5 mm thick) were torn (tensile mode) until they fractured at room temperature (21° C., above $T_g$ of the PU's soft-segments). All the samples were coated with a layer of gold or platinum before measurements.

To make the images comparable, regions having the same fracture characteristics on the fracture surfaces of the samples were displayed. The regions shown in FIGS. 10-13 are the crack-growth-region, which is quite similar to those found in glasses and ceramics. It has 3 typical parts: the first part is generally a smooth region, called mirror; the second part is the region of small radial ridges, called mist; and the third part is the region of rougher ridges, called hackle. We can see these 3 regions clearly in FIG. 12-B. In general, the 3 regions are caused by the propagation of a pre-existing flaw subsequent to the application of a critical stress, and the radius of the mirror ring is related to the applied stress. The detailed mechanism to form such a morphology is still unknown.

FIGS. 10-13 are cryogenic fractographs of the neat PU and composites containing 10 wt % 2.5 µm and 10 wt % 33 nm ZnO particles. Samples for FIGS. 10-12 were prepared by the same procedure as described in the experimental section. The sample for FIG. 13 was dipped in the liquid nitrogen for about 2 hours, compared to the usual 20 minutes for the other samples. The longer time in liquid nitrogen is to make sure that the sample is completely cooled down. Comparing these images, obvious difference may be found between the neat PU and the nanocomposites: There are some "patch" patterns on the mirror region of the neat PU and the microcomposite samples (FIG. 10 (C), FIG. 13 (B) and (C), FIG. 11 (B) and (C); FIG. 10 (D) shows another kind of patch patterns found in PU samples), while the mirror region of the nanocomposite is very smooth (FIG. 12 (B) and (C)). There are no apparent differences between images in FIGS. 10 and 13, which means that 20 minutes in liquid nitrogen is sufficient for samples to cool down.

In general, patch patterns in polymer fracture surface are believed to form during brittle, unstable fracture in the glassy polymers. During the brittle, unstable fracture, craze breakdown occurs primarily by the fibril-matrix separation along the interface between crazed and uncrazed material at the upper or lower craze edge. The process results in a patchwork structure of the residual craze matter on the final fracture surface. Crazing is a mode of localized plastic deformation that occurs particularly in glassy polymers subject to tensile stresses. Crazing involves orientation of molecular chain segments in the direction of the principal stress together with cavitation or voiding.

Taking into consideration notions regarding crazing, it is not difficult to explain the disappearance of the patch patterns in the fractographs of the nanocomposites. Because of phase-separation and relatively weaker strength of the soft-domains, crazing forms in the soft-domains of the neat PU and the microcomposite when subject to tensile stresses, and will break when the stresses reach a critical value. In this process, the fibrils are broken in the crazing and subsequently the crazing breaks down to form the patch patterns in the neat PU and microcomposite. In the nanocomposite, the situation is different. Because of the much smaller phase-separation and the crosslinking effect of ZnO nanoparticles, which means much less plastic deformation in the nanocomposites and more constraint on the extension of the fibrils in the crazing, it is likely that breakdown will happen around the surface of the ZnO nanoparticles or the interface between the domains before the applied stress reaches the critical value to form the patch patterns. Thus, without the mechanism of the crazing breakdown, the nanocomposite behaves quite similar to glasses and ceramics in cryogenic fracture. In fact, it was found that the nanocomposites are much easier to fracture and much more brittle than the neat PU and microcomposites in liquid nitrogen.

Images shown in FIG. 14 are ambient fractographs of the neat PU and the composites. They are different from those for the cryogenically fractured samples. They are much flatter and smoother. There are also some differences between the ambient fractographs of the neat PU and the composites. The surface of the neat PU is flattest and smoothest, and the surface of the microcomposite is still flat except for some pores formed by pulling out of the particles, while the surface of the nanocomposite is the roughest. While not being bound by theory, it is believed that the explanation for the cryogenic fracture mentioned above is still available in the ambient case. In the neat PU, crazing breakdown in the soft-domains still plays a key role in the fracture of the polymer. The soft-segments of the polymer have much larger mobility at room temperature than at $-193°$ C. ($T_g$ of the soft-segments is about $-20°$ C.). Thus, after breakdown, required by minimizing the surface energy, the soft-segments of the PU can rearrange to form flat surfaces to minimize the surface area at a temperature higher than $T_g$. In the nanocomposite, a similar mechanism is operative, but because of the much smaller phase-separation and the crosslinking effect of ZnO nanoparticles, the mobility of the soft-segments of the polymer is constrained, and breakdown can happen around the interfaces. Thus, minimizing the surface area in the nanocomposite is not as efficient as in the neat PU and some of the hard-domains appear on the fractured surfaces, which forms the much rougher fracture surfaces in the nanocomposites.

Based on the analysis above, the SEM images supports the notion that adding ZnO nanoparticles changes the microstructures, and thus changes the fracture behaviors of the PU.

Example 5

FTIR Measurements

FTIR (Perkin Elmer Paragon 1000) measurements were conducted at room temperature using the transmission mode. In Example 4, it was suggested that adding ZnO nanoparticles changes the microstructures of the PU, and it was reasoned that such an effect is possibly due to the reaction between the nanoparticles and the PU prepolymer. This reasoning is supported by FTIR data.

FIG. 15 is the FTIR of products of the PU prepolymer reacting with ZnO 2.5 µm and 33 nm particles. The products were formed under the same condition for the preparation of the composites: particles and the prepolymer were mixed in THF and sonicated at 0° C. for 20 min. Then the particles were separated out from the solution and the unreacted prepolymer by centrifuging for 3 times. The separated particles (products) are cured at 110° C. for 24 hours under vacuum. From FIG. 15, there appears to be no discernible difference for ZnO microparticles before and after reacting with the prepolymer, but for the nanoparticles, signals are quite different: after reacting, several peaks appear. The peak around 3000 $cm^{-1}$ belongs to the C—H stretch, and the peak around 3500 $cm^{-1}$ belong to the hydrogen-bonding free N—H stretch, which means that the prepolymer does react with ZnO nanoparticles and attached on the particles' surface.

FIG. 16 is the FTIR of PU and the composite with 5 wt % 33 nm ZnO particles cured at 110° C. for 24 hours. No difference (since the amount of hydroxyl groups on the ZnO surface is so small, compared to the amount of the prepolymer) can be seen between the two spectra except one peak around 500 $cm^{-1}$ in the composite which belongs to the ZnO particles. Comparing FIGS. 15 and 16, we can see that N—H stretch for the reacted particles is around 3500 $cm^{-1}$, while for the PU and composite, it is around 3300 $cm^{-1}$. The difference is caused by the hydrogen bonding. In the reacted nanoparticles, the formed NH groups are constrained by the ZnO surface geometry and thus can not form H-bonding, which appear at a higher frequency in IR spectrum. In the neat polymer and composite, polymer chain is flexible and a NH can easily find a carbonyl group to form H-bonding to stabilize the system.

Example 5

Defunctionalized ZnO Nanoparticles

From the presented experiments, it is clear that the mechanical properties change in the PU/ZnO nanocomposites is due to the microstructure change of PU, and this microstructure change is due to the reaction between the hydroxyl groups on ZnO nanoparticles and the prepolymer. This reasoning is borne out in using ZnO/PU nanocomposites where the hydroxyl groups from the ZnO surface are removed.

33 nm ZnO particles with $SiCl_3C_{12}H_{23}$ (Si3) to cover most of the hydroxyl groups on the particles' surface (the surface hydroxyl groups react with the silane to form Zn—O—Si bonds), are provided into a 5 wt % nanocomposite, and the composite is measured with tensile tests and DMTA. Results are shown in FIG. 17 and FIG. 18. Detailed data are listed in Table 1. The results from these experiments suggest that the composite with coated ZnO nanoparticles behave similarly to the microcomposite and neat PU, but differently from the composite with uncoated ZnO nanoparticles. It is believed that no change in the microcomposite is observed because the surface area of the microparticles is too small to be considered, compared to that of the nanoparticles.

From the foregoing description, one skilled in the art can easily ascertain the essential characteristics of this invention, and without departing from the spirit and scope thereof, can make various changes and modifications of the invention to adapt it to various usages and conditions without undue experimentation. All patents, patent applications and publications cited herein are incorporated by reference in their entirety. Furthermore, the following references are incorporated herein by reference in their entirety:

1. M Alexander; P Dubois Mater. Sci. Eng. Rev. 2000, 28, 1
2. A C Balazs Curr. Opin. Colloid. Interface Sci. 2000, 4, 443
3. E P Giannelis Appl. Orgamet. Chem. 1998, 12, 675
4. P P Soo, B Y Huang, Y I Jang, Y M Chiang, D R Sadoway, A M Mayers J Electrochem Soc. 1999, 146, 32
5. Y Kojima, A Usuki, M Kawasumi, O Okada, Y Fukushima, T Kurachi, O Kamigato J. Mater. Res. 8, 1185, 1993
6. M Templin, A Franck, A DuChesne, H Leist, Y M Zhang, R Ulrich, V Schadler, U Wiesner Science 1997, 278, 1795
7. D Zhao, J Feng, Q Huo, N Melosh, G H Fredrickson, B F Chmelka, G D Stucky Science 1998, 279, 548
8. V Z H Chan, J Hoffman, V Y Lee, H Iatrou, A Avgeropoulos, N Hadjichristidis, R D Miller, E L Thomas Science 1999, 286, 1716
9. R B Thompson, V V Ginzburg, M W Matsen, A C Balazs Macromolecules 2002, 35, 1060
10. T L Morkved, P Wiltzius, H M Jaeger, D G Grier, T A Witten Appl. Phys. Lett. 1994, 64, 422
11. R W Zehner, W A Lopes, T L Morkved, H M Jaeger, L R Sita Langmuir 1998, 14, 241
12. D E Fog, L H Radzilowski, R Blanski, R R schrock, E L Thomas Macromolecules 1997, 30, 417
13. D E Fog, L H Radzilowski, B 0 Dabbousi, R R schrock, E L Thomas, M G Bawendi Macromolecules 1997, 30, 8433
14. C Hepburn Polyurethane Elastomers, Elsevier Science Publishers LTD, Essex, England, 1992
15. D J David, H B staley Analytical Chemistry of the Polyurethanes, Volume XVI, Part 3, Wiley-Interscience, a Division of John Wiley & Sons, NY, USA,
16. C Zilg, R Thomann, R Mulhaupt, J Finter Adv. Mater. 1999, 11, 49
17. Y I Tien, K H Wei Macromolecules, 2001, 34, 9045
18. Z Wang, T J Pinnavaia Chem. Mater., 1998, 10, 3769
19. J H Chang, Y U An J. Polym. Sci., Part B, Polym Phys., 2002, 40, 670
20. M Tortora, G Gorrasi, V Vittoria, G Galli, S Ritrovati, E Chiellina Polymer, 2002, 43, 6147
21. K J Yao, M Song, D J Hourston, D Z Luo Polymer, 2002, 43, 1017
22. J Zheng, R W Siegel, C G Toney J. Polym. Sci., Part B, Polym. Phys., In press
23. R A Beck, R W Truss Polymer, 1999, 40, 307
24. Unpublished results.
25. B Fu, W J Macknight Rubber Chem. Tech., 1986, 59, 896
26. Y I Tien, K H Wei Polymer, 2001, 42, 3213
27. C Li, S L Cooper Polymer, 1990, 31, 3
28. S Schrader, X Li, F Guo, Y Liu, J Luo, D Xu Makromol. Chem. Rapid Commum., 1998, 9, 597
29. J T Garrett, C A Siedlecki, J Runt Macromolecules, 2001, 34, 7066
30. R S Mclean, B B Sauer Macromolecules 1997, 30, 8314
31. A Takahashi, R Kita, M Kaibara J. Mater. Sci., 2002, 13, 259
32. D J Martin, G F Meijs, G M Renwick, P A Gunatillake, S J McCarthy J. Appl. Polym. Sci., 1996, 60, 557
33. D J Martin, G F Meijs, G M Renwick, S J McCarthy, P A Gunatillake J. Appl. Polym. Sci., 1996, 62, 1377
34. C W Patterson, D Hanson, A Redondo, S L Scott, N Henson J. Polym. Sci., Part B, Polym. Phys., 1999, 37, 2303
35. J J Mecholsky, S W freiman Fracture Mechanics Applied to Brittle Materials, ASTM STP 678, S W Freiman, Ed., Amer. Soc. Test. Mater., 1979,136
36. K Friedrich Adv. Polym. Sci., 1983, 52/53, 225
37. J A Sauer, C C Chen Adv. Polym. Sci., 1983, 52/53, 169.

What is claimed is:

1. A nanocomposite comprising a polyurethane (PU) block copolymer and ZnO nanoparticles, wherein the ZnO nanoparticles act as chemical crosslinking points, which constrain chain mobility of the polyurethane block copolymer, and thus the nanocomposite exhibits less phase separation than the PU block copolymer in neat form,
wherein the PU block copolymer comprises a polyurethane having the following structure:

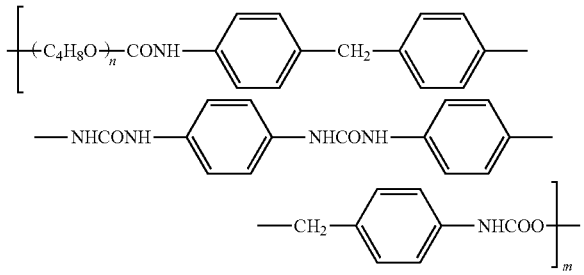

wherein m and n each independently represents a positive integer.

2. The nanocomposite of claim 1, wherein:
the ZnO nanoparticles segregate into microdomains formed by a phase in the block copolymer thereby ordering the ZnO nanoparticles.

3. The nanocomposite of claim 1, wherein the glass transition temperature ($T_g$) of the PU increases with increasing ZnO nanoparticle loading.

4. The nanocomposite of claim 1, wherein the storage modulus of the PU decreases with increasing ZnO nanoparticle loading.

5. The nanocomposite of claim 1, wherein the Young's modulus of the PU decreases with increasing ZnO nanoparticle loading.

6. A nanocomposite comprising a polyurethane (PU) block copolymer and ZnO nanoparticles, wherein the ZnO nanoparticles act as chemical crosslinking points, which constrain chain mobility of the polyurethane block copolymer, and thus the nanocomposite exhibits less phase separation than the PU block copolymer in neat form, wherein the glass transition temperature ($T_g$) and the storage modulus of the PU are controlled simultaneously by the ZnO nanoparticles,
wherein the PU block copolymer comprises a polyurethane having the following structure:

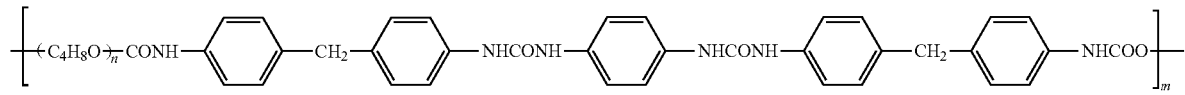

wherein m and n each independently represents a positive integer.

7. A method of making the nanocomposite of claim 3, comprising:
   (a) providing precursors of the PU block copolymer;
   (b) providing a nanofiller comprising ZnO nanoparticles;
   (c) sonicating said PU block copolymer precursors and said nanofiller in a solvent; and
   (d) polymerizing said PU block copolymer precursors;
thereby producing said nanocomposite composition.

8. The method of claim 7, wherein the control of the microstructure achieves control of the bulk morphology of a block copolymer.

9. The method of claim 7, wherein:
   the ZnO nanoparticles segregate into microdomains formed by a phase in the block copolymer thereby ordering the ZnO nanoparticles.

10. The method of claim 7, wherein the glass transition temperature ($T_g$) of the PU increases with increasing ZnO nanoparticle loading.

11. The method of claim 7, wherein the $T_g$ and the storage modulus of the PU are controlled simultaneously by the ZnO nanoparticles.

12. The method of claim 7, further comprising concentrating the PU block copolymer precursors and the nanofiller in the solvent after the step of sonicating the PU block copolymer precursors and the nanofiller in the solvent and prior to the step of polymerizing said PU block copolymer precursors.

13. The nanocomposite of claim 1, wherein the nanocomposite is produced by a process comprising:
   (a) providing PU block copolymer precursors;
   (b) providing a nanofiller comprising ZnO nanoparticles;
   (c) sonicating said PU block copolymer precursors and said nanofiller in a solvent; and
   (d) polymerizing said PU block copolymer precursors.

14. The nanocomposite of claim 1, wherein the nanocomposite comprises no domains with a width greater than about 10 nm.

* * * * *